US012541961B2

(12) United States Patent
Wang et al.

(10) Patent No.: US 12,541,961 B2
(45) Date of Patent: Feb. 3, 2026

(54) INFORMATION EXTRACTION METHOD OF OFFSHORE RAFT CULTURE BASED ON MULTI-TEMPORAL OPTICAL REMOTE SENSING IMAGES

(71) Applicant: Aerospace Information Research Institute, Chinese Academy of Sciences, Beijing (CN)

(72) Inventors: Chengyi Wang, Beijing (CN); Lianfa Li, Beijing (CN); Lei Wang, Beijing (CN); Zujia Wang, Beijing (CN); Yunlong Kong, Beijing (CN); Yi Zhang, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 572 days.

(21) Appl. No.: 17/979,164

(22) Filed: Nov. 2, 2022

(65) Prior Publication Data

US 2023/0306730 A1 Sep. 28, 2023

(30) Foreign Application Priority Data

Mar. 23, 2022 (CN) .......................... 202210293377.5

(51) Int. Cl.
*G06V 10/80* (2022.01)
*G06V 10/26* (2022.01)
(Continued)

(52) U.S. Cl.
CPC ............ *G06V 10/803* (2022.01); *G06V 10/26* (2022.01); *G06V 10/772* (2022.01);
(Continued)

(58) Field of Classification Search
CPC .... G06V 10/803; G06V 10/774; G06V 20/50; G06V 10/26; G06V 10/82; G06V 10/772; G06V 20/70
See application file for complete search history.

(56) References Cited

U.S. PATENT DOCUMENTS

2018/0189564 A1* 7/2018 Freitag .................. G06F 18/214
2020/0342226 A1* 10/2020 Bengtson ............... G06Q 10/04
(Continued)

FOREIGN PATENT DOCUMENTS

CN     108256534 A  *  7/2018  ........... G06K 9/4671
CN     109409265 A  *  3/2019  ........... G06K 9/0063
(Continued)

OTHER PUBLICATIONS

Cui, Binge, et al. "Extracting raft aquaculture areas from remote sensing images via an improved U-net with a PSE structure." Remote Sensing 11.17 (2019): 2053. (Year: 2019).*
(Continued)

*Primary Examiner* — Kathleen M Broughton
*Assistant Examiner* — Alexander John Rodgers
(74) *Attorney, Agent, or Firm* — Merchant & Gould P.C.

(57) ABSTRACT

The present disclosure discloses an extraction method of raft culture area based on multi-temporal optical remote sensing images, including: constructing a raft culture marker sample library including culture types such as fish, shellfish, and algae; optimizing the deep learning model of the UNet network by using ASPP (Atrous Spatial Pyramid Pooling) and the shape constraint module; using the deep learning model to extract a corresponding multi-temporal raft culture area by using the multi-temporal optical remote sensing images with medium resolution in the target area; combining
(Continued)

prior knowledge, fusing the extraction results of the raft culture area to obtain a final extraction results of the raft culture area.

8 Claims, 3 Drawing Sheets

(51) Int. Cl.
  *G06V 10/772* (2022.01)
  *G06V 10/774* (2022.01)
  *G06V 10/82* (2022.01)
  *G06V 20/50* (2022.01)
  *G06V 20/70* (2022.01)
(52) U.S. Cl.
  CPC ............ *G06V 10/774* (2022.01); *G06V 10/82* (2022.01); *G06V 20/50* (2022.01); *G06V 20/70* (2022.01)

(56) References Cited

U.S. PATENT DOCUMENTS

| | | | | |
|---|---|---|---|---|
| 2021/0286998 | A1* | 9/2021 | Wilson | G06N 3/08 |
| 2022/0210987 | A1* | 7/2022 | Baldo | A01G 25/16 |

FOREIGN PATENT DOCUMENTS

| | | | |
|---|---|---|---|
| CN | 109871812 A | 6/2019 | |
| CN | 112801911 A | 5/2021 | |
| CN | 113674281 A | 11/2021 | |

OTHER PUBLICATIONS

Lu, Yimin, Wei Shao, and Jie Sun. "Extraction of offshore aquaculture areas from medium-resolution remote sensing images based on deep learning." Remote Sensing 13.19 (2021): 3854. (Year: 2021).*

Cui, Yishuo, et al. "Remote sensing identification of marine floating raft aquaculture area based on sentinel-2A and DEM data." Frontiers in Marine Science 9 (2022): 955858. (Year: 2022).*

Hou, Qibin, et al. "Strip pooling: Rethinking spatial pooling for scene parsing." Proceedings of the IEEE/CVF conference on computer vision and pattern recognition. 2020. (Year: 2020).*

Zhang, Y.; Wang, C.; Chen, J.; Wang, F. Shape-Constrained Method of Remote Sensing Monitoring of Marine Raft Aquaculture Areas on Multitemporal Synthetic Sentinel-1 Imagery. Remote Sens. 2022, 14, 1249. https://doi.org/10.3390/rs14051249 (Year: 2022).*

First Office Action issued in corresponding Chinese Application No. 202210293377.5, dated Jul. 26, 2022 (18 pages including English Translation).

Second Office Action issued in corresponding Chinese Application No. 202210293377.5, dated Oct. 17, 2022 (14 pages including English Translation).

Cui et al., "Extracting Raft Aquaculture Areas from Remote Sensing Images via an Improved U-Net with a PSE Structure", Remote Sensing, 2019, pp. 1-19.

* cited by examiner

INFORMATION EXTRACTION METHOD OF OFFSHORE RAFT CULTURE BASED ON MULTI-TEMPORAL OPTICAL REMOTE SENSING IMAGES

CROSS-REFERENCE TO RELATED APPLICATION

This application claims the priority of Chinese Patent Application No. 202210293377.5 filed on Mar. 23, 2022 in the China National Intellectual Property Administration, the content of which is incorporated herein by reference in entirety.

TECHNICAL FIELD

The present disclosure relates to a field of marine remote sensing and computer vision artificial intelligence technology, and in particular, to an extraction method of raft culture area based on multi-temporal optical remote sensing images.

BACKGROUND

Raft culture is an important intensive culture mode. In coastal areas, rafts are generally composed of floats, bamboo and ropes, and are fixed on both sides by stakes or anchors, which may be are used as supports for the cultivation of various aquaculture species. The development of the raft aquaculture industry has produced huge economic benefits, which may effectively relieve a pressure of fishing on marine fisheries, and at the same time effectively supplement a protein source of the global population. However, the raft aquaculture industry has also caused many problems, such as illegal farming. Encroachment of marine nature reserves and seaways is increasingly common and has a negative impact on coastal ecosystems and maritime traffic. Therefore, it is urgent to strengthen a monitoring of raft aquaculture areas to ensure an orderly and sustainable development of the raft aquaculture industry.

Raft culture has the characteristics of large distribution area and wide distribution range. It is time-consuming and laborious to use a conventional manual survey method, and it is difficult to obtain complete and accurate information. Remote sensing technology has advantages of wide coverage, real-time availability, objectivity, and accuracy, and may play an important role in raft aquaculture monitoring. In particular, medium-resolution remote sensing images are very suitable for remote sensing monitoring in large-scale aquaculture areas.

At present, although researchers around the world have proposed many methods for extracting aquaculture areas based on remote sensing images, there are generally certain technical or application defects. The methods includes: visual interpretation method based on expert experience, index method and classification method based on feature information, and all of the above-mentioned methods require a lot of manual intervention, and it is difficult to achieve a balance between high resolution and good robustness. In recent years, machine learning method is used to extract aquaculture areas. The use of machine learning, especially deep learning methods, improves an accuracy of remote sensing extraction of aquaculture areas, but it lacks a comprehensive and authoritative sample library for the construction of aquaculture sample library in raft aquaculture areas. In a field of deep learning, CNN (Convolutional Neural Network), R-CNN (Region with Convolutional Neural Network feature) and FCN (Fully Convolutional Network) model, U-Net model and Deeplab V3 have developed and evolved rapidly in image classification, object detection and semantic segmentation tasks, but most methods only perform local area extraction experiments, and are still lacking in the extraction and application of large-scale and large-area raft culture. At present, there are still many potential problems in the large-scale and accurate extraction of marine aquaculture areas based on medium-resolution remote sensing images (such as the constraints of data source itself, the robustness of the method and the limitation of the scope of use), which makes it impossible to perform raft culture area extraction of large-scale scenes. The current technical and application problems are summarized as follows:

(1) The current main methods do not effectively solve the extraction problem of large-scale raft culture, and most methods implement the extraction of local small-scale research areas;

(2) The single-temporal optical image extraction of raft aquaculture has the problem of omission of a large number of aquaculture areas. At the same time, there is a phenomenon of "adhesion" in the raft aquaculture areas, and the boundary is blurred and difficult to determine. Influenced by ships and other floating objects, the types are diverse, and the shape changes greatly, which makes accurate extraction of the raft aquaculture areas difficult;

(3) There are many different types of raft aquaculture areas. The current method may only achieve the extraction of aquaculture areas, and only a small number of raft aquaculture areas may be identified. There are problems such as low extraction accuracy and incomplete extraction types.

SUMMARY

In order to solve the above-mentioned shortcomings, the present disclosure provides an extraction method of raft culture area based on multi-temporal optical remote sensing images, including:

Step 1: constructing a raft culture marker sample library, wherein the sample library includes the distinction of three different types of raft culture: fish, shellfish and algae;

Step 2: constructing a UNet network model based on ASPP and shape constraints;

Step 3: calculating NDWI index (Normalized Difference Water Index) of the multi-temporal optical remote sensing images and add the NDWI index to an image band;

Step 4: extracting, based on the UNet network model based on ASPP and shape constraints in step 2, a corresponding raft culture area by using the multi-temporal optical remote sensing images with medium resolution in a target area; and Step 5: combining prior knowledge, fusing extraction results of the raft culture area obtained in Step 4, so as to obtain a final extraction result of the raft culture area.

Further, a process of constructing the sample library includes:

Step 1: calculating NDWI index (Normalized Difference Water Index) of the multi-temporal optical remote sensing images and add the NDWI index to the image band;

Step 2: determining whether image data for constructing the sample library exceeds a standard size;

Step 3: dividing the image data into blocks and dividing marked data into blocks, in response to the image data exceeding the standard size;

Step 4: selecting samples according to geographical partition and characteristics of the culture area, and performing a rationality evaluation on a formed sample set; and Step 5: completing the construction of the sample library in response to meeting an evaluation standard; repeating sample selection, resampling, and evaluation operation until the construction of the sample library is completed in response to not meeting the evaluation standard.

Further, a principle of sample selection is: a sample size of each geographical partition is relatively balanced; a principle of rationality evaluation includes: whether a proportion of each sample type is reasonable and whether the number of samples is sufficient.

Further, the UNet network model based on ASPP and shape constraints is constructed based on the UNet model, and an Atrous Spatial Pyramid Pooling module, a strip pooling module, an attention mechanism module and a shape constraint module are added to the UNet model.

Further, the adding operation of the strip pooling module comprises: given horizontal-vertical strip pooling layer with a plurality of angles, establishing an association between discretely distributed regions, and encoding striped regions.

Further, the adding operation of the attention mechanism module comprises: given an intermediate feature map, attention weights are sequentially inferred along two dimensions of space and channel, and multiplied with an original feature map to adjust the weights adaptively.

Further, the addition operation of the shape constraint module comprises: using the marked shape for learning, and embedding the trained shape representation as a regularizer into a loss function of a semantic segmentation network, so as to implement the shape constraint of the raft culture;

encoding shape features by using a shape representation auto-encoder; wherein the shape representation auto-encoder takes ground truth masks of training samples as input and output to learn shape representation of buildings; using a basic UNet auto-encoder structure, and using residual connection between each encoding layer and a corresponding decoding layer without using a residual unit for optimizing a learning process; and encoding a morphological feature of the raft culture area with a latent shape representation of an intermediate layer, and reconstructing an input image in a decoder based on a latent shape representation layer, wherein the input image is a raft culture area mask image; performing a pre-training on the shape representation auto-encoder by using mask labels of training samples, and embedding the trained shape representation as a regularizer into a loss function of a semantic segmentation network.

Further, an extraction process of a corresponding raft culture area in Step 4 comprises: dividing the multi-temporal optical images into blocks, and merging block extraction results after the block extraction results are extracted by the optimized UNet network model based on ASPP and shape constraints; merging to obtain the extraction result of the culture area corresponding to the image; converting the extraction result into vector data by using raster vectorization, and converting the extraction result to a polygon.

Further, a fusing rule of the extraction results is: using different temporal phases to search for objects which have a superposition relationship with a target position, determining whether the objects are the same target according to area constraint; if the objects are the same target, the area with a larger area is selected as a target area; and for the area where the same target is not found, an addition principle is adopted to achieve the fusing of the results.

DETAILED DESCRIPTION OF EMBODIMENTS

The present disclosure will be described in further detail below with reference to specific embodiments and the accompanying drawings.

Figure 1:
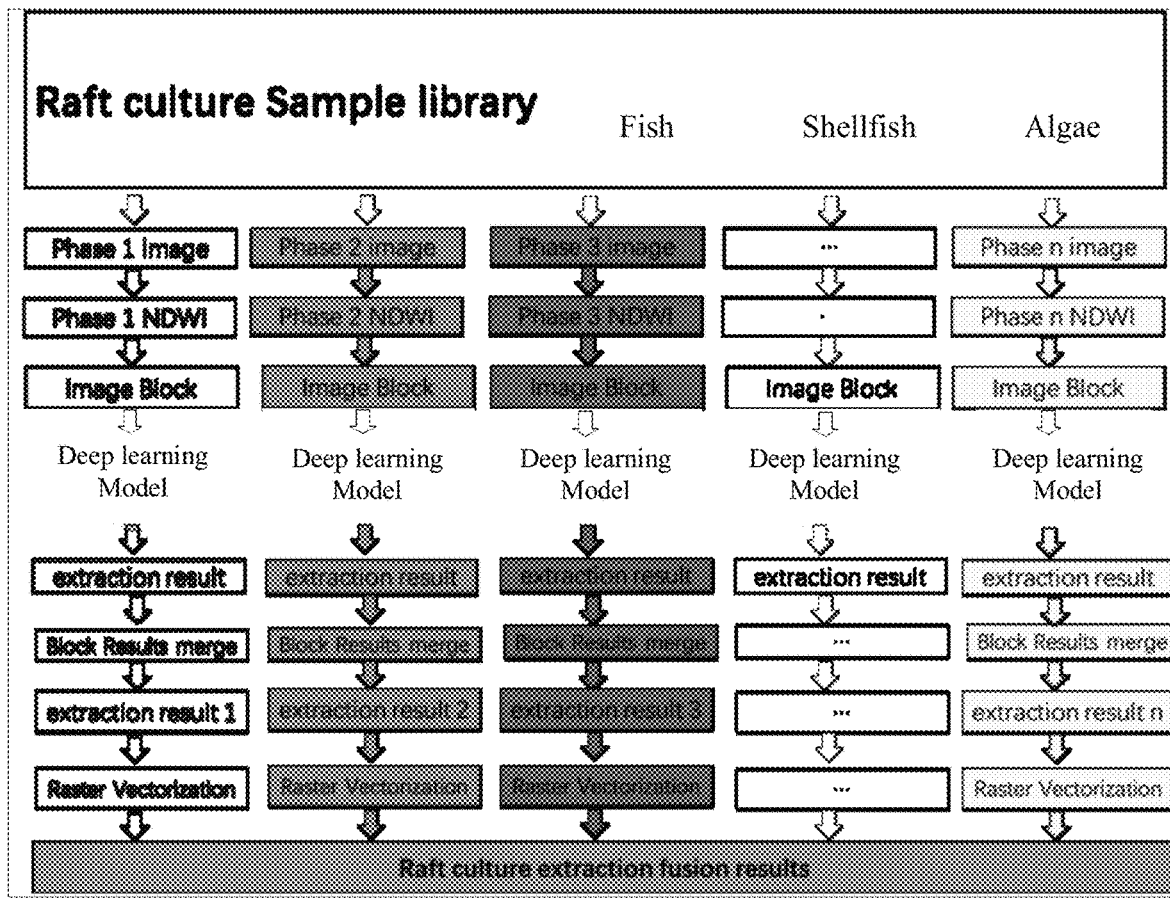
FIG. 1 shows an overall flow chart of the present disclosure.

The present disclosure discloses an extraction method of raft culture area based on multi-temporal optical remote sensing images, which adopts a deep learning method to extract the raft culture area from the optical remote sensing images. Since the raft culture area is affected by factors such as seasonal changes, moisture and sea conditions, the single-temporal optical remote sensing image often may not obtain all the raft culture area. Therefore, the present disclosure combines the multi-temporal optical remote sensing images, extracts the raft culture area through the customized depth learning model, fuses the extraction results of multi-temporal images, and finally obtains the spatial distribution and culture type of the raft culture area in the study area. The specific process is shown in FIG. 1.

In Step 1, the raft culture marker sample library is constructed.

The sample library is used to support a subsequent deep learning model training to ensure the update and improvement of the deep learning model. The sample library is designed according to the classification system. Due to the variety of raft culture types, it is generally divided into three main types of raft culture: fish, shellfish and algae. The appearance of different raft culture types varies greatly, and different culture types may be distinguished by different appearances. On the other hand, samples are also established for marine targets that are easy to be confused with raft culture, such as boats and other floating objects, so as to improve the extraction accuracy of raft culture. Therefore, a raft culture marker sample library with the representative of different types of culture areas, the representative of different areas of culture areas, and the easily confused object marks may be constructed.

The construction of the sample library mainly includes the following rules. First, the regional distribution of sample collection is representative, that is, the geographical partition and the characteristics of the raft culture area are included. Secondly, the sample includes a sufficient number of different types of raft culture. Thirdly, the subjectivity of the type is ensured when selecting the sample.

Figure 2:
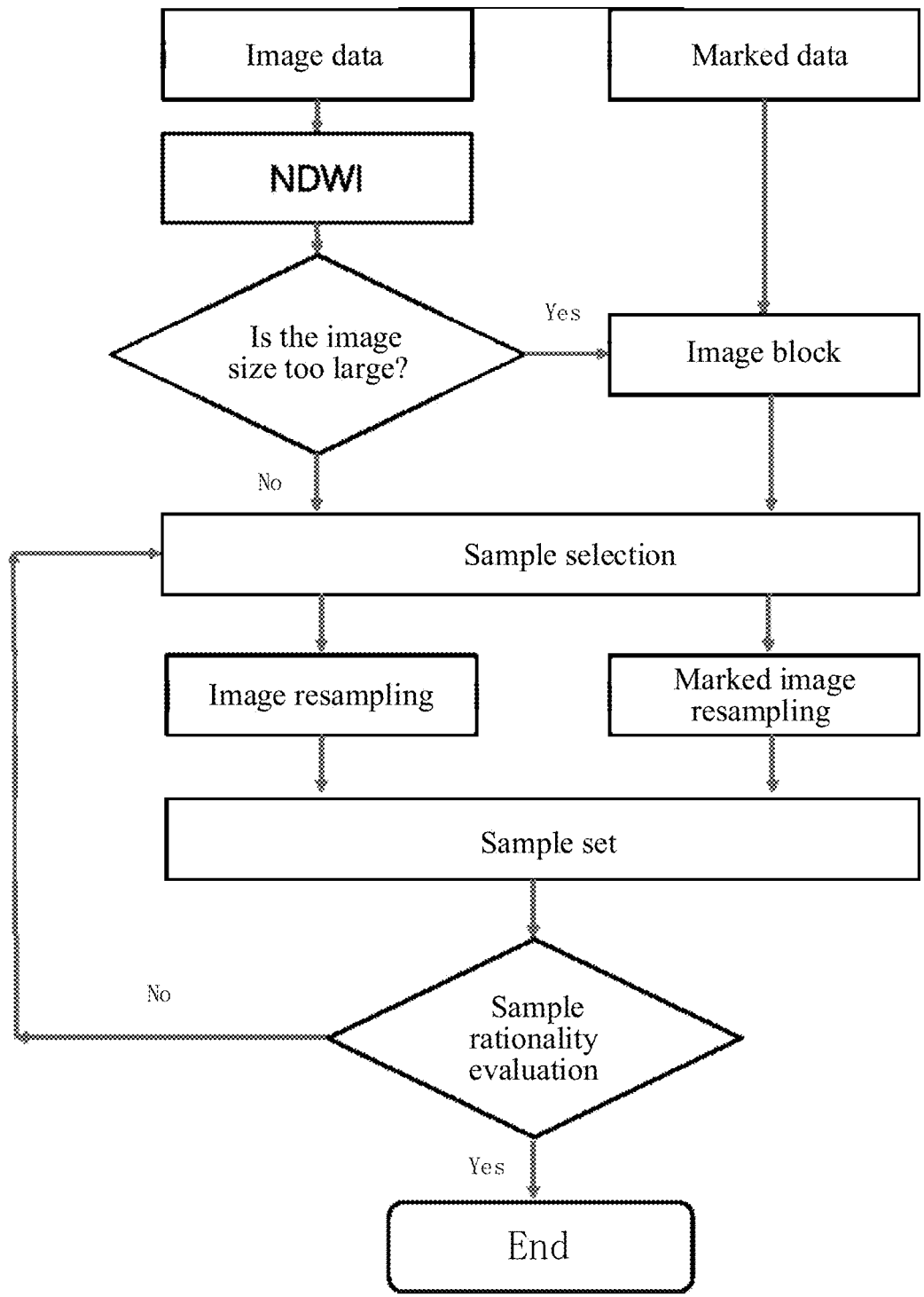
FIG. 2 shows a flow chart of a construction of a raft culture marker sample library of the present disclosure.

The construction process of the sample library is shown in FIG. 2. The specific process is as follows: first, determining whether the image data for constructing the sample library exceeds a standard size; dividing the image data into blocks and dividing marked data into blocks, in response to the image data exceeding the standard size; then selecting samples according to geographical partition and characteristics of the culture area. The general principle is that the sample size of each geographical partition is relatively balanced; then the samples are re-sampled to make the pixel size of each sample consistent. Then, the rationality of a formed sample set is evaluated. The principle of evaluation includes whether a proportion of each sample type is reasonable and whether the number of samples is sufficient. If an evaluation standard is met, the sample library construction is completed; if not, sample selection such as adding new samples, adjusting samples, etc., is further performed, and resampling and evaluation operations are performed again until the sample library construction is completed.

In Step 2, a UNet network model based on ASPP and shape constraints is constructed.

Compared with the methods such as FCN, Deeplab V3 and the like, the UNet network model is found to have relatively good extraction effect on raft culture. Therefore, the deep learning model adopted by the present disclosure implements targeted improvement based on the UNet model, and finally obtains the UNet network model based on ASPP and shape constraints, wherein the main improvement directions are as follows.

(1) Atrous Spatial Pyramid Pooling (ASPP) module is added to improve the receptive field of the model.

Figure 3:
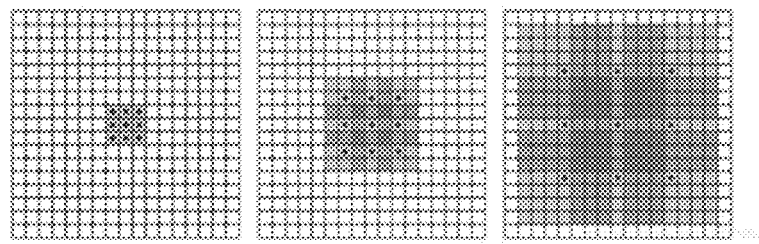
FIG. 3 shows a schematic diagram of ASPP module of the present disclosure.

FIG. 3 shows a schematic diagram of the added ASPP module. The Atrous Spatial Pyramid Pooling (ASPP) samples the given input in parallel with atrous convolution at different sampling rates, which is equivalent to capturing context information of an image at a plurality of scales. Therefore, feature information at different scales may be extracted, so that information extraction of the culture area may be more effectively achieved.

(2) A strip pooling module and an attention mechanism module are added to improve the extraction probability of raft culture area.

As an artificial target, the raft culture presents a strip-like distribution in remote sensing images. According to this arrangement rule, the strip pooling module may be added to the UNet model. Given horizontal-vertical strip pooling layer with certain angle, it is easy to correlate between discretely distributed regions due to the long and narrow kernel, and encode the striped regions. Due to its narrow kernel shape and focus on capturing local details, these properties make strip pooling different from conventional spatial pooling that relies on square kernels.

Figure 4:
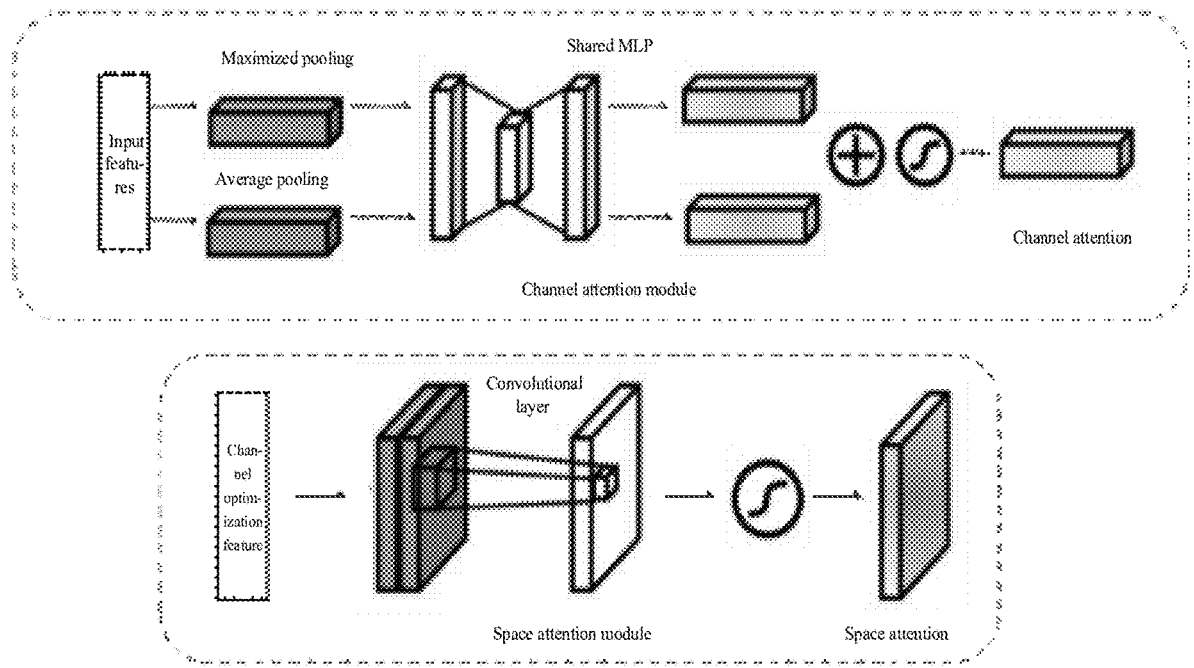
FIG. 4 shows a schematic diagram of an attention mechanism module of the present disclosure.

Compared with an ocean surface as a background, the raft culture is a target that is quite different from the background. An attention mechanism may be added to the UNet model to improve the extraction efficiency. Given an intermediate feature map, attention weights are sequentially inferred along two dimensions of space and channel, and then multiplied with an original feature map to adjust the features adaptively. The details are shown in FIG. 4.

(3) Constraining in combination with the target shape.

The shape of the culture area in the 10-meter spatial resolution optical image of raft culture has certain rules and obvious characteristics of artificial design. In order to obtain the shape knowledge of the culture area, the marked shape is used for learning, and the result of the learning is used to implement the shape constraints.

To encode shape features, the present disclosure develops a shape representation auto-encoder. The shape representation auto-encoder learns the shape representation of the raft culture area with ground truth masks of training samples as input and output. The basic UNet auto-encoder structure is used, and the residual connections between each encoding layer and its corresponding decoding layer (but no residual units are used) are used to optimize the learning process. The morphological features of the raft culture area are encoded with the latent shape representation of the intermediate layer, and then the input image (namely a raft culture area mask image) is reconstructed in the decoder based on the latent shape representation layer. Pre-training is performed on the shape representation auto-encoder by using mask labels of training samples, and then the trained shape representation as a shape constraint is embedded into a loss function of a semantic segmentation network.

In summary, this step is based on an improvement of the UNet model to obtain the UNet optimized network model based on ASPP and shape constraints. According to the characteristics of the raft culture area, including the large change in the size of the culture area, the strip-shaped arrangement rules, the large difference from the background and the relatively fixed shape etc., the UNet network model is optimized in a targeted manner by adding ASPP, strip pooling, attention mechanism and shape constraint modules to implement the extraction of raft culture area from medium spatial resolution optical images.

In Step 3, the NDWI index (Normalized Difference Water Index) of the multi-temporal optical remote sensing images is calculated and this feature is added to the image band. The index is defined as follows:

$$NDWI=(p(Green)-p(MIR))/(p(Green)+p(MIR))$$

The normalized difference processing is performed with a specific band of the remote sensing image to highlight the difference between the water in the image and the raft culture and other aquatic targets.

In Step 4, based on the UNet network model based on ASPP and shape constraints in Step 2, the corresponding raft culture area is extracted by using the multi-temporal medium resolution (about 10-meter spatial resolution) optical remote sensing images within the culture area.

Since the breadth of a satellite remote sensing image is very wide, and the data volume is large, the deep learning model is suitable for information extraction only by image blocks. Therefore, the multi-temporal optical images are firstly divided to blocks, and the image blocks are implemented by adopting a certain overlapping rate in the image blocking process so as to facilitate the combination of subsequent extraction results.

After the block extraction results are extracted through the Unet network model based on ASPP and shape constraints, the block results are merged. The extraction results of the culture area corresponding to the image are obtained by the merging. Since the results extracted by deep learning are mostly binary images, for data fusion and application, grid vectorization is required to convert the extracted results into vector data. Raster vectorization uses mature conversion methods (referring to ArcGIS raster vectorization tools) to convert the extraction results into a polygon.

In Step 5, combining prior knowledge, the extraction results of the multi-temporal raft culture area obtained in Step 4 are fused to obtain a final extraction result of the raft culture area.

Due to the effects of ocean currents and tides, the position of the same raft culture area in different temporal phases may be shifted to different degrees, and the shape may also change to a certain extent, but the relative range changes little. Therefore, result fusing is required. The method adopted by the present disclosure is based on area control, and uses the constraints of position and shape to determine whether it is the same culture area. The specific rules are as follows.

Different temporal phases are used to search for objects which have a superposition relationship with a target position, and then whether they are the same target is determined according to area constraint (for example, an area overlap rate reaches a certain proportion).

If it is the same target, the area with a larger area is selected as the target area, because the sea state, weather and other reasons may lead to the loss of part of the culture area information, resulting in the reduction of the extracted area.

For the area where the same target is not found, the addition principle is used to achieve the fusion of the results in order to solve the problem of omission of the extraction of the culture area from the single-phase image. That is, as long as the culture area is found in one temporal image, the area would eventually be a raft culture area.

In summary, the extraction method of raft culture area based on multi-temporal optical remote sensing images disclosed in the present disclosure mainly includes three steps in the process of the extraction method. First, the present disclosure is based on the sample library with the representative of different types of culture areas, the representative of different areas of culture areas, and the easily confused object marks. Secondly, the present disclosure uses the UNet optimized network model based on ASPP and shape constraints with the targeted design. Finally, the range of raft culture area is extracted respectively from the multi-phase optical images in the culture period, and the extraction results are fused by a certain addition rule to obtain the target raft culture area.

The UNet network model based on ASPP and shape constraints is obtained based on an improvement of the UNet model. According to the characteristics of the raft culture area, including the large change in the size of the culture area, the strip-shaped arrangement rules, the large difference from the background and the relatively fixed shape etc., the UNet network model is optimized by adding ASPP, strip pooling, attention mechanism and shape constraint modules to implement the extraction of optical images with a spatial resolution of about 10 meters.

A multi-temporal raft culture area fusion method is adopted. Aiming at the omission problem of extracting the raft culture area by using single-temporal optical image, the multi-temporal optical images are adopted to extract the raft culture area and certain rules are adopted to fuse the extraction results, so as to more accurately extract the raft culture area. The part is an important link of the extraction method flow of the multi-temporal optical image raft culture area.

The present disclosure discloses an extraction method of raft culture based on multi-temporal optical remote sensing images, which may not only detect the raft culture area, but also identify the type of the culture area, and finally forms a practical large-scene raft culture remote sensing extraction method, and provides technical support for dynamic monitoring of raft culture. In addition, a representative sample library suitable for raft culture in different sea areas is constructed, and a deep learning model for raft culture extraction is designed to implement the extraction of raft culture areas in large scenes and different regions. The extraction results of the multi-temporal optical image raft culture are fused, and the problem of omissions in the extraction of raft culture areas is reduced. According to the characteristics of medium-resolution images of about 10 meters, the shape constraint is adopted to achieve fine extraction and type identification of raft culture areas.

Compared with the related art, the present disclosure has the following technical advantages.

(1) A raft culture marker sample library capable of distinguishing fish, shellfish and algae of culture types is established, and a set of standardized sample library construction solution and a representative sample library for deep learning training may be provided for the industry.

(2) The UNet optimized network model based on ASPP and shape constraints is constructed. The raft culture area may be efficiently and highly accurately extracted from single-temporal optical image, the recognition accuracy may be improved and the culture type information may be obtained.

(3) By adopting the multi-temporal raft culture area fusing method, the missed detection of single-temporal optical image to the raft culture area may be effectively reduced, and the practicability of extracting the raft culture area from the optical image may be effectively improved.

The above-mentioned embodiments are not intended to limit the present disclosure, and the present disclosure is not limited to the above-mentioned examples. Changes, modifications, additions or replacements made by those skilled in the art within the scope of the technical solutions of the present disclosure should all fall within the protection scope of the present disclosure.

What is claimed is:

1. An extraction method of raft culture area based on multi-temporal optical remote sensing images, comprising:
    Step 1: constructing a raft culture marker sample library, wherein the sample library comprises samples of fish, shellfish, and algae of raft culture types;
    Step 2: constructing an improved UNet network model based on ASPP (Atrous Spatial Pyramid Pooling) and shape constraints;
    Step 3: calculating NDWI index (Normalized Difference Water Index) of the multi-temporal optical remote sensing images and add the NDWI index to an image band;
    Step 4: extracting, based on the UNet network model based on ASPP and shape constraints in Step 2, a corresponding multi-temporal raft culture area by using the multi-temporal optical remote sensing images with medium resolution; and
    Step 5: fusing extraction results of the multi-temporal raft culture area obtained in Step 4, so as to obtain a final extraction result of the raft culture area,
    wherein a fusing rule of the extraction results is: using different temporal phases to search for objects which have a superposition relationship with a target position, determining whether the objects are the same target according to area constraint; if the objects are the same target, the area with a larger area is selected as a target area; and for the area where the same target is not found, an addition principle is adopted to achieve the fusing of the results.

2. The extraction method of raft culture area based on multi-temporal optical remote sensing images according to claim 1, wherein a process of constructing the sample library comprises:
    calculating NDWI index (Normalized Difference Water Index) of the multi-temporal optical remote sensing images and add the NDWI index to an image band;
    determining whether image data for constructing the sample library exceeds a standard size;

dividing the image data into blocks and dividing marked data into blocks, in response to the image data exceeding the standard size;

selecting samples according to geographical partition and characteristics of the culture area, and performing a rationality evaluation on a formed sample set; and completing the construction of the sample library in response to meeting an evaluation standard; repeating sample selection, resampling, and evaluation operation until the construction of the sample library is completed in response to not meeting the evaluation standard.

3. The extraction method of raft culture area based on multi-temporal optical remote sensing images according to claim 2, wherein a principle of sample selection is: a sample size of each geographical partition is relatively balanced; a principle of rationality evaluation comprises: whether a proportion of each sample type is reasonable and whether the number of samples is sufficient.

4. The extraction method of raft culture area based on multi-temporal optical remote sensing images according to claim 1, wherein the UNet network model based on ASPP and shape constraints is optimized based on the UNet model; and an Atrous Spatial Pyramid Pooling module, a strip pooling module, an attention mechanism module and a shape constraint module are added to the UNet model.

5. The extraction method of raft culture area based on multi-temporal optical remote sensing images according to claim 4, wherein the adding operation of the strip pooling module comprises: given horizontal-vertical strip pooling layer with a plurality of angles, and encoding striped regions, wherein the strip pooling layer further focuses on capturing local details based on a narrow kernel shape along other dimensions of the strip pooling layer.

6. The extraction method of raft culture area based on multi-temporal optical remote sensing images according to claim 4, wherein the attention mechanism module adopts an attention mechanism fusing space and channel that learn an importance of channel and an importance of space, respectively, wherein attention weights are sequentially inferred along two dimensions of space and channel, and multiplied with an original feature map to adaptively adjust the weights.

7. The extraction method of raft culture area based on multi-temporal optical remote sensing images according to claim 4, wherein adding the shape constraint module comprises: using a marked shape for learning, and constraining the shape by using a shape knowledge learned from the marked shape;

encoding shape features by using a shape representation auto-encoder; wherein the shape representation auto-encoder takes shape marks of training samples as input and output, and learns shape representation of the raft culture area; using a basic UNet auto-encoder structure, and using residual connection between each encoding layer and a corresponding decoding layer without using a residual unit for optimizing a learning process; and encoding a morphological feature of the raft culture area with a latent shape representation of an intermediate layer, and reconstructing an input image in a decoder based on a latent shape representation layer, wherein the input image is a raft culture area mask image; performing a pre-training on the shape representation auto-encoder by using mask labels of training samples, and embedding the trained shape representation as a regularizer into a loss function of a semantic segmentation network.

8. The extraction method of raft culture area based on multi-temporal optical remote sensing images according to claim 1, wherein an extraction process of a corresponding raft culture area in Step 4 comprises: dividing the multi-temporal optical images into blocks; extracting block extraction results by the UNet network model based on ASPP and shape constraints; merging the block extraction results; merging to obtain the extraction result of the culture area corresponding to the image; converting the extraction result into vector data by using raster vectorization, and converting the extraction result to a polygon.

\* \* \* \* \*